United States Patent Office 3,373,031
Patented Mar. 12, 1968

3,373,031
ESTROGENIC COMPOUNDS AND ANIMAL GROWTH PROMOTERS
Jerome L. Martin, Terre Haute, Ind., assignor to Commercial Solvents Corporation, a corporation of Maryland
No Drawing. Continuation-in-part of application Ser. No. 566,486, July 20, 1966. This application Mar. 3, 1967, Ser. No. 620,266
8 Claims. (Cl. 99—2)

ABSTRACT OF THE DISCLOSURE

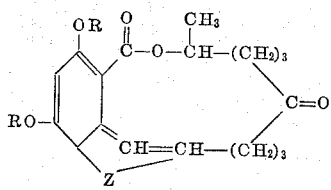

where R is selected from the group consisting of hydrogen, benzyl and lower alkyl, and Z is selected from the group:

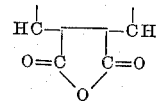

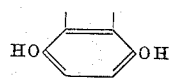

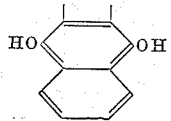

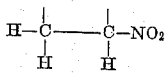

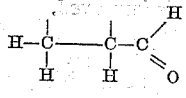

This application is a continuation-in-part of application Serial No. 566,486, filed July 20, 1966, now abandoned.

The present invention relates to new compounds and an object of the present invention is to provide compounds which exhibit estrogenic activity or aid in increasing the rate of growth in meat-producing animals, e.g. cattle, lamb and swine.

The compounds of this invention are illustrated by the formula:

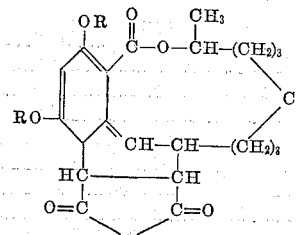

where R is hydrogen, substituted or unsubstituted alkyl, e.g. lower alkyl such as methyl, ethyl, hexyl, etc. or aralkyl, e.g. benzyl.

The compounds of the present invention can be produced from the compound:

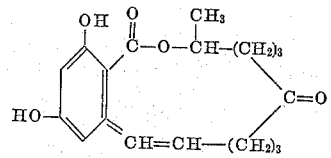

hereinafter referred to as the fermentation estrogenic substance (F.E.S.) by the Diels-Alder reaction. The hydroxyl groups can be converted to ethers, e.g. methyl ethers, as taught in U.S. Patent 3,239,342. Benzyl ethers of F.E.S. are described in copending application Ser. No. 532,113, filed Mar. 7, 1966, now abandoned, and application Ser. No. 620,259, filed Mar. 3, 1967.

and animal feeds containing growth promoting amounts thereof.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g. vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The following examples serve to illustrate the invention.

Example I

F.E.S. (0.1 mole) is gradually added to 0.1 mole (9.8 grams) of a well cooled suspension of maleic anhydride in 60 ml. of benzene. The mixture is warmed to about 60° C. and then held for several hours. The benzene is evaporated off and the product crystallized from methanol to yield:

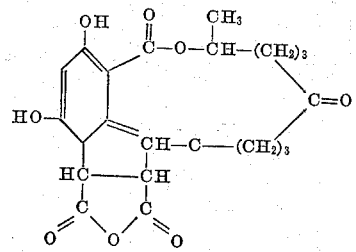

Example II

F.E.S. 2,4-dimethylether and F.E.S. 4-benzylether are reacted according to the procedure of Example I to produce the corresponding F.E.S. ether compound.

Example III

Contact a 0.1 mol of F.E.S. dissolved in 500 ml. of ethyl ether with SO₂ under a pressure of 1 to 100 p.s.i.g. at room temperature for a period of one to three weeks. Sulfur dioxide adds to the F.E.S. as indicated below:

The product is obtained in about a 70 percent yield and is separated from starting F.E.S. by column chromatography.

Example IV p-Benzoquionone (10.8 grams or 0.1 mole) is reacted with 0.1 mole of F.E.S. in the presence of about 0.01 mole of acetic acid. The flask is cooled with water initially and then allowed to stand at room temperature for 48 hours. The adduct shown below is separated from starting F.E.S. by crystallization:

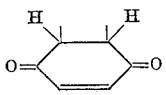

The adduct is then isomerized by heating with a small amount of HCl and SnCl₂ for 15 minutes to give the final product:

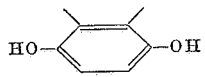

Example V 1,4-naphthoquinone (15.8 grams or 0.1 mole) is reacted with 0.1 mole F.E.S. in the presence of about 0.01 mole of acetic acid. The flask is cooled with water initially and then allowed to stand at room temperature for 48 hours. The adduct shown below is separated from starting F.E.S. by crystallization:

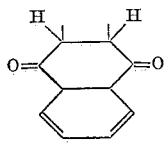

The adduct is then isomerized by heating with a small amount of HCl and SnCl₂ for 15 minutes to give the final product:

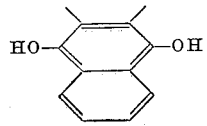

Example VI

Nitroethylene (0.1 mole or 7.3 grams) is reacted with F.E.S. (0.1 mole) dissolved in 500 ml. of ether at a temperature of 20° C., for several days. The ether and unreacted nitroethylene are removed by distillation and the product purified by distillation. The yield of product is 60 percent.

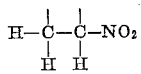

Example VII

Acrolein (0.1 mole or 5.6 grams) is added to 0.1 mole of F.E.S. dissolved in 500 ml. of ether to which has been added a small amount of acetic acid (0.2 gram). The mixture is held at 25° C., for 72 hours after which the ether and acrolein are separated by distillation. The purified product is obtained by crystallization in a yield of 55 percent.

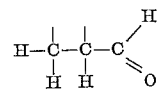

This product may be reduced by H₂ over palladium charcoal to give:

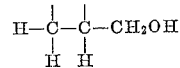

Example VIII

Six head of cattle are fed a daily ration of alfalfa hay and ground corn cobs containing 1 to 20 grams of the compound of Example I per 100 pounds of ration and their rate of growth is improved.

Example IX

Six head of cattle are fed a daily ration of alfalfa hay and ground corn cobs containing 1 to 20 grams of the compound of Example II per 100 pounds of ration and their rate of growth is improved.

Example X

Six head of cattle are fed a daily ration of alfalfa hay and ground corn cobs containing 1 to 20 grams of the compound of Example III per 100 pounds of ration and their rate of growth is improved.

Example XI

Six head of cattle are fed a daily ration of alfalfa hay and ground corn cobs containing 1 to 20 grams of the compound of Example IV per 100 pounds of ration and their rate of growth is improved.

Example XII

Six head of cattle are fed a daily ration of alfalfa hay and ground corn cobs containing 1 to 20 grams of the compound of Example V per 100 pounds of ration and their rate of growth is improved.

Example XIII

Six head of cattle are fed a daily ration of alfalfa hay and ground corn cobs containing 1 to 20 grams of the compounds of Example VI per 100 pounds of ration and their rate of growth is improved.

Example XIV

Six head of cattle are fed a daily ration of alfalfa hay and ground corn cobs containing 1 to 20 grams of the compound of Example VII per 100 pounds of ration and their rate of growth is improved.

The following are specific examples of animal feed compositions of this invention useful for increasing the rate of growth and feed efficiency of young animals to market weight.

Example XV

For young beef cattle, i.e., calves to yearlings running to two year olds, each animal is given 5 to 20 milligrams per day of the compound produced in Example I intimately admixed in about 18 to 22 pounds per head per day of a complete pelleted ration for about 180 days. The complete pelleted ration includes in addition to the compound of Example I the following:

| | | |
|---|---|---|
| Barley | percent | 40–43 |
| Molasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | MMI.U./ton | 2–4 |

Note.—Milo or corn, for example, can be substituted for the barley.

The compound of Example I is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

*Example XVI*

For young swine, i.e., six week old pigs to about 100 pound pigs, each animal is given 5 to 20 milligrams per day of the compound of Example III intimately admixed in about 1½ to 5½ pounds per head per day of a grower ration until it reaches a weight of about 100 pounds. When the swine weight between 90 and 125 pounds the feed is changed to one whereby each animal is given 20 to 50 milligrams per day of the compound of Example III intimately admixed in about 5½ to 10 pounds per head per day of a finisher ration until it reaches market weight of about 220 pounds. The grower and finisher ration include in addition to the compound of Example III the following:

| | Grower, percent | Finisher, percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example III is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

*Example XVII*

For 4 to 10 month old lambs weighing 50 to 70 pounds, each animal is given 1 to 15 milligrams per day of the compound of Example IV, intimately admixed in about 3 to 6 pounds per head per day of a complete ration for 30 to 90 days. The complete ration includes in addition to the compound of Example IV the following:

| | Lbs. |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example IV is admixed with the above ingredients in a blender in the following amounts in milligrams per pound to provide an appropriate complete feed with dosage levels ranging from 1 to 15 milligrams per head per day.

| Mg./pound: | Mg./head/day |
|---|---|
| .5 | 2 |
| 1.0 | 4 |
| 1.5 | 6 |
| 2.0 | 8 |
| 2.5 | 10 |
| 3.75 | 15 |

*Example XVIII*

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example VI in the grower and finisher feed each of which includes in addition to the compound of Example VI the following:

| | Grower (lbs.) | Finisher (lbs.) |
|---|---|---|
| Ground Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins Trace Minerals and Antibiotics | 10 | 10 |

It is claimed:
1.

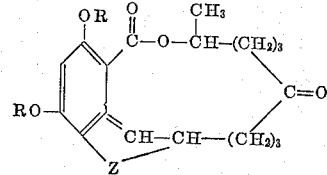

where R is selected from the group consisting of hydrogen, benzyl and lower alkyl, and Z is selected from the group:

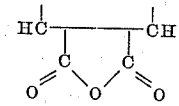

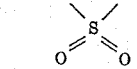

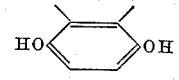

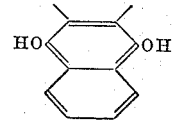

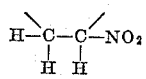

and

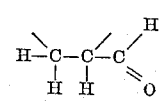

2. The compound of claim 1 where R is hydrogen.
3. The compound of claim 1 where R is benzyl.
4. The compound of claim 1 where R is lower alkyl.
5. An animal feed composition comprising a nutrient feed ration and a growth promoting amount of the compound of claim 1.
6. An animal feed composition comprising a nutrient feed ration and a growth promoting amount of the compound of claim 2.
7. An animal feed composition comprising a nutrient feed ration and a growth promoting amount of the compound of claim 3.
8. An animal feed composition comprising a nutrient feed ration and a growth promoting amount of the compound of claim 4.

No references cited.

A. LOUIS MONACELL, *Primary Examiner.*

H. H. KLARE III, *Assistant Examiner.*

UNITED STATES PATENT OFFICE
CERTIFICATE OF CORRECTION

Patent No. 3,373,031   March 12, 1968

Jerome L. Martin

It is hereby certified that error appears in the above numbered patent requiring correction and that the said Letters Patent should read as corrected below.

Column 1, first formula, line 20, "CH=CH-" should read -- CH-CH- --; line 47, after the formula insert -- and --; same column 1, after the last formula of the Abstract, insert -- and animal feeds containing growth promoting amounts thereof. --. Column 2, lines 6 to 12, portion of the formula reading 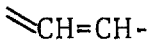 should read 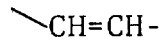
lines 20 and 21, cancel "and animal feeds containing growth promoting amounts thereof."; lines 58 to 68, the formula should appear as shown below:

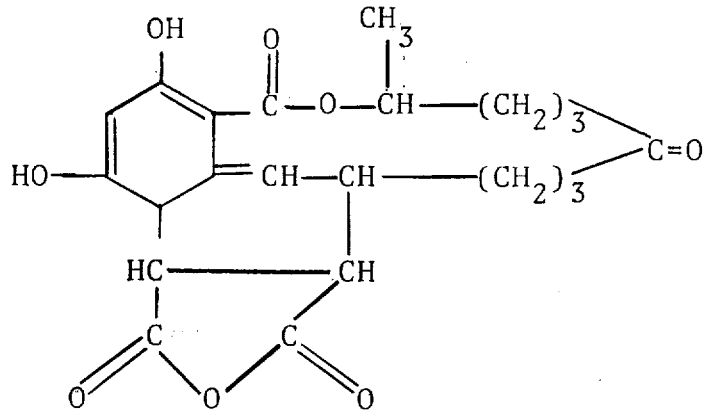

Column 5, line 24, "weight" should read -- weigh --. Column 6, lines 40 to 48, the left-hand portion of the formula should appear as shown below:

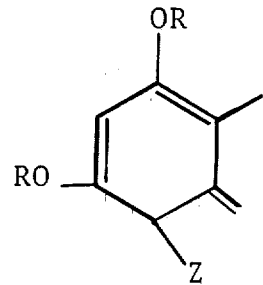

Signed and sealed this 14th day of October 1969.

(SEAL)
Attest:

EDWARD M. FLETCHER, JR.
Attesting Officer

WILLIAM E. SCHUYLER, JR.
Commissioner of Patents